June 9, 1942.  D. McI. PROCTOR  2,285,834
PROCESS FOR THE TREATMENT OF ORGANIC MATTER BY FERMENTATION
Filed Aug. 8, 1938
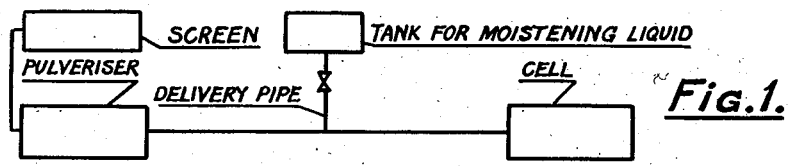
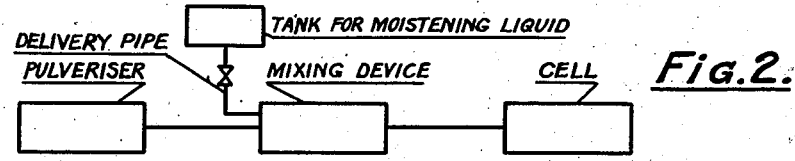
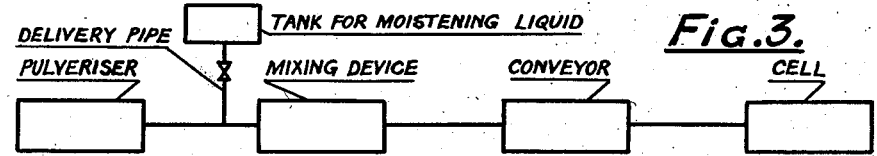
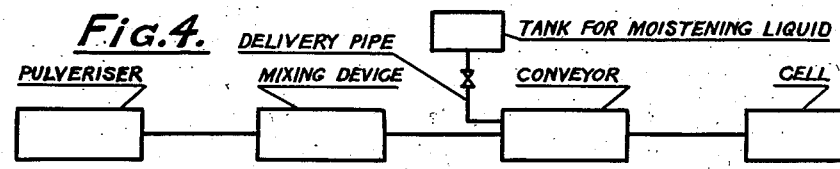
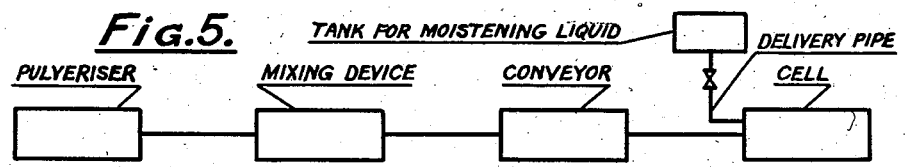
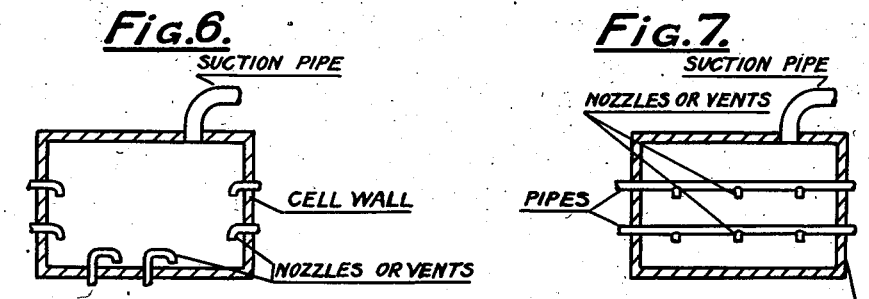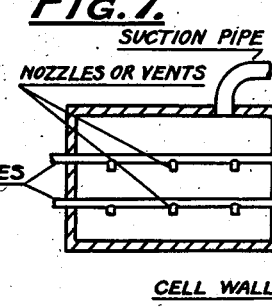
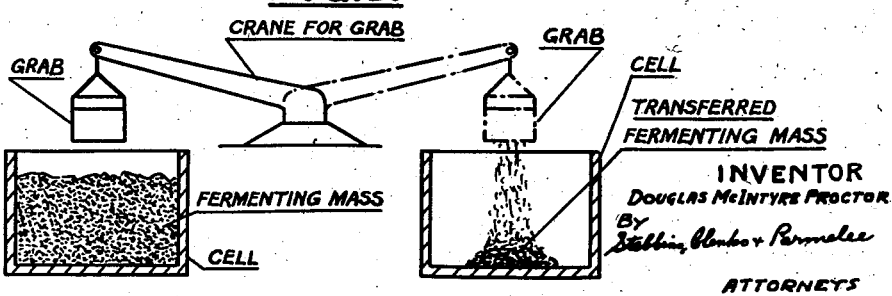
INVENTOR
DOUGLAS McINTYRE PROCTOR
BY
ATTORNEYS Patented June 9, 1942

2,285,834

UNITED STATES PATENT OFFICE 2,285,834

PROCESS FOR THE TREATMENT OF ORGANIC MATTER BY FERMENTATION

Douglas McIntyre Proctor, Bushey, England, assignor to Mitchell Engineering Limited, London, England, a British company Application August 8, 1938, Serial No. 223,648
In Great Britain July 10, 1937

4 Claims. (Cl. 71—9)

This invention is for improvements in or relating to a process for the treatment of organic matter by fermentation.

It has hitherto been proposed in treating organic matter, particularly such materials as town and house refuse, to impregnate the material with bacteria-containing liquors and to subject the impregnated material to two stages of fermentation; the first, an anaerobic, and the second, an aerobic fermentation. The primary object of the anaerobic fermentation is to disintegrate and degrade the material by breaking down its cellular structure, whilst in the aerobic fermentation—although further degradation does take place the chief object is to effect oxidation and nitrification of the material and at the same time to reduce surplus moisture by evaporation which takes place at the higher temperatures generated by the action of aerobic bacteria.

It will be readily appreciated that the time required to break down organic matter, solely by means of bacterial action, varies widely according to the nature and density of the substances being treated, and as it is frequently necessary in commercial practice to treat together, and in the same period of time, an extremely varied assortment of material, it is impossible to achieve uniform degradation throughout the mass by the prior processes.

It is therefore an object of this invention to provide a process for the treatment of organic matter which is simpler, quicker and more certain than the processes hitherto proposed, and which will provide a product sufficiently uniform in quality and appearance to satisfy reasonable commercial requirements.

According to this invention, a process for the treatment of organic matter by fermentation consists in mechanically pulverizing the said matter, moistening the pulverized mass, and storing it in a cell under aerobic conditions. It will be understood that the expression "aerobic condition" is used to indicate a condition in which free air is available for the aerobic bacteria present in the mass to develop and to effect degration of the organic matter. Preferably, air is forced through the mass under pressure so as to ensure that a sufficient supply of air passes through the cell to enable the aerobic bacteria actively to propagate and operate throughout all parts of the mass in the cell. The pulverizing process breaks down almost instantaneously the various cellular structures, irrespective of their density, and intimately mixes the material thereby leading to a very uniform final product.

Instead of forcing air into the mass aeration may be effected by aspirating air through the mass, for example, by means of a suction fan disposed outside the cell but connected thereto by means of pipes or ducts; alternatively compressed air may be forced in at the base of the cell and drawn away at the top by the said fan. A further alternative method of aeration consists in transferring the mass from one cell to another by means of a grab or other device which picks up the material from the top of one cell and drops it from a height to the bottom of another cell. This operation may be carried out three or more times at intervals of about three days thus ensuring that all the material receives equal treatment in regard to aeration and evaporation and that the weed-seeds and any pathogenic germs which may have been present in the mass are completely destroyed.

A feature of the invention consists in moistening the pulvertized material as it enters the cell or another container such as may be used for conveying it to the cell; alternatively it may be moistened as it enters or passes through a mixer of the paddle or screw type.

A further feature of the invention consists in that a neutralizing agent is added to the mass to counteract acidity present or likely to develop during the progress of the fermentation process.

Ordinary town and house refuse contains, in addition to organic matter, such as vegetable and animal wastes, paper and cartons, a variable quantity of inorganic materials such as ash and cinders, glass bottles and jars, broken procelain and crockery, tins and other metallic articles, and it is a feature of the invention that in treating town and house refuse the organic matter is screened, preferably during delivery to the pulverizer, to separate therefrom the greater part of the ash and cinders and the remaining larger inorganic articles are then picked by hand from the mass, conveniently, as it passes along a travelling conveyor band to the pulverizer.

Tins of small size are not, however, removed at this stage, but are passed through the pulverizing machines because they assist in masticating the organic matter and are themselves greatly reduced in bulk while still remaining in a condition convenient for de-tinning.

The organic matter in refuse always contains sufficient aerobic bacteria to ensure an active ferment after being pulverized and moistened with water, but if sewage sludge is conveniently available, its addition is beneficial to the ultimate product. Ammoniacal gas liquor may also be used for moistening the pulverized refuse as its adds to the nitrogen content of the product.

The following is a description, by way of example, of one mode of carrying the invention into effect.

Town and house refuse as collected is delivered from a bin or hopper to a screen, preferably of the rotary type and having screen apertures of such size as will allow the greater part of the cinder, ash and dust to pass through and these constituents may be screened a second time to separate the fine ash and dust from the cinder in order that the latter may be used as a cheap fuel, and the former may be disposed of to brickworks or a part of it may be mixed with the organic matter at a later stage in the treatment.

Bottles, crockery, rags, rope and the larger tins and metallic articles are passed out of the screen on to a wide conveyor belt with the main mass of the organic material and are picked therefrom by hand and transferred to convenient receptacles for washing and sterilizing, while the organic matter—including tins of ordinary size and other small metallic articles—is fed into a suitable pulverizing machine by the conveyor belt. In passing through the pulverizer which is preferably of the swinging hammer or ball mill type the organic matter, irrespective of its nature and density is immediately reduced to shreds and comparatively small pieces and thus intimately intermixed, while the tins are battered and greatly reduced in bulk.

Separation of the ferrous metal articles from the pulverized organic matter is effected by means of a magnetic pulley which collects the metal and drops it down a chute to a hopper; the tin-coated articles are in such a condition that the tin can be removed easily from the inner and outer surfaces. The tins and other metal articles may be transported loose or fed to a baling machine according to requirements.

The pulverized organic matter now being substantially free from all deleterious inorganic matter is, at this stage, moistened with a sufficient quantity of water, sewage sludge, or ammoniacal gas liquor to ensure an active ferment. The amount of moisture added is regulated according to requirements and may be about 5% by weight. It is convenient to add also at this stage, the quantity of neutralizing agent calculated to be necessary to counteract any acidity which is present or which is likely to develop during fermentation.

A variety of neutralizing agents may be used, but we prefer to use carbonate of lime in the form of ground chalk (95 to 98% CaCO$_3$) as it is cheap and is not in itself caustic; therefore a quantity well in excess of estimated requirements may safely and beneficially be added, from 5% up to 8% being a normal quantity. To ensure uniform distribution of moisture and intimate admixture of chalk these ingredients may be added as the pulverized material is passing into and through a mixer of the paddle or screw type, or as it enters a hopper, container, or other receptacle from which, or in which, it can be conveniently transferred to and uniformly distributed throughout a fermentation cell or chamber; or alternatively the material may be conveyed direct from the pulverizer to the cell on a conveyor belt adapted to enable the pulverized material, with the aforesaid additions of moisture and chalk to be uniformly distributed throughout the cell.

A cell may be of any convenient shape and size to suit site conditions and the daily quantity of material to be treated, but to avoid excessive packing of the material, by compression due to its own weight, the depth of material should not exceed 18 ft. and the cubic content of a cell should always be sufficient to hold the maximum day's supply calculated on the basis of five cubic yards to one ton of pulverized refuse.

The materials used in the construction of cells may be either reinforced concrete, brick or stone and with all the internal surfaces rendered smooth by a lining of impermeable cement. Cells may be constructed wholly above or wholly below ground level, or partly above and partly below ground level according to the nature of the ground, climate and other factors governing conditions at the site, the requisite being that the construction shall be such as to maintain the correct temperature for fermentation.

Aeration of the material charged into the cell may be effected by air under pressure conveyed into the cell by pipes terminating in vents situated on the floor and in the side walls and/or by pipes, pierced with holes, traversing the cell, and/or terminated by nozzles projecting into the cell. The pipes are placed and controlled in such manner as will substantially assure uniform distribution of air throughout the mass and are so constructed that the force of the air current is downwardly directed at the exits from said vents, holes or nozzles, in order better to promote diffusion of air throughout the mass.

Temperature control is important and this may be assisted by imbedding tubes containing thermometers of the thermo-couple type, at different points throughout the mass and having leads which may be connected either to a multi-point recording instrument, or from which readings may be taken at regular intervals by means of a portable indicator. The temperature may be substantially regulated by the admission of more or less air at the points indicated as requiring correction and a temperature of 180° F. to 185° F. should be reached at all points throughout the mass to ensure the destruction of all pathogenic germs and weed-seeds which may be present in it but it is neither necessary nor desirable to maintain so high a temperature beyond a few hours and air may be admitted intermittently or continuously according to the conditions indicated by temperature readings.

In order to withdraw from the cell the large volume of moisture evaporated during the process and also the gases generated thereby, ducts or pipes of ample cross-section leading from the top of the cell to an exhaust fan are provided. The partial vacuum created by the exhaust fan also assists in distributing and diffusing the admitted air through the mass. Exhaustion of the moisture evaporated and the gases generated by the process of fermentation is continuous whether or not air is being admitted to the cell and as these gases—principally carbon dioxide and a small quantity of methane—are substantially absorbed by the vapour which condenses and as the resultant liquor is innocuous it may be discharged into a drain.

There is no malodorous emanation from the product of the process or from the exhaust gases but to obviate any possible objection that might arise if the latter were released direct to atmosphere they may be led by duct from the fan to the furnace of a small boiler, which will utilize as fuel a portion of the cinder screened from the refuse and/or any other unwanted combustible matter picked from it. The boiler will be utilized to generate steam for sterilizing bottles and jars and to supply hot water for their primary cleansing and also for baths and lavatories provided for the staff and personnel operating the plant.

An alternative method to the one described of carrying out the process of fermentation from start to finish in one cell is as follows:

The material after being pulverized and mixed with moisture and ground chalk may be charged into a cell as before and is allowed to ferment there for a period of three complete days, with or without artificial aeration in the manner already described; on the fourth day from the day of charging, it is transferred to a second cell in such a way that the material forming top layers of No. 1 cell forms the bottom and lower layers of No. 2 cell, and in transferring the material means are adopted whereby the material is opened up and exposed in a loose state to the action of the atmosphere thus naturally aerating it. The material so aerated is then evenly distributed throughout the second cell and remains there for a further period of three clear days to allow the temperature to rise and the ferment to develop. It is then again transferred, in a like manner, to a third cell and again allowed to ferment for a period of three clear days which completes the process.

Under normal circumstances and conditions, the material treated will, within a period of nine or ten days, diminish in bulk by about one-third of its original volume when charged into the cell. The final product resembles in appearance a well-prepared leaf-mould; it is aseptic and not malodorous and constitutes a well balanced organic fertilizer having a moisture content of from 20% to 30%, which is sufficiently low for the material to be transported in bulk and spread directly on to the land, but if a finer product is required for packing and storing in bags, the material may be further dried by natural or artificial means, and it may be subjected to a further crushing and screening operation to reduce the size of the component particles to any desired degree of comminution.

The annexed drawing is a diagrammatic illustration of the process and of the arrangement and disposition of parts of the cell.

Figure 1 is a diagrammatic representation of the process,

Figure 2 is similar to Figure 1 but incorporates a mixing device,

Figure 3 is similar to Figure 2 but includes a conveyor between the mixing device and the cell, Figure 4 shows an arrangement similar to that of Figure 3 in which the moistening takes place in the conveyor, Figure 5 shows a similar arrangement to that of Figures 3 and 4 except that the moistening takes place at the entrance to the cell.

Figure 6 is a diagrammatic view of one form of cell arrangement showing the disposition of nozzles or vents in the cell walls and cell floor, the vents being downwardly directed so that compressed air may be discharged downwardly into the mass in the cell; a suction pipe may be provided for aspirating air through the mass and may be used in addition to or instead of the nozzles or vents.

Figure 7 shows an alternative arrangement to that of Figure 6 in which pipes traverse the cell and are also provided with downwardly directed nozzles or vents; a suction pipe may be provided for aspirating air through the mass and may be used in addition to or instead of the nozzles or vents.

Figure 8 is a diagrammatic representation of an alternative method of aerating the mass in which the fermenting mass in one cell is picked up by a grab suspended from a crane or similar device and discharged from the grab into the bottom of a second cell.

I claim:

1. A new process for the treatment of house refuse which comprises first, converting the refuse by mechanical comminution into a loose shredded mass, regulating the moisture in the shredded mass prior to fermentation to provide a quantity of liquid necessary for efficient and complete fermentation without destroying the loose nature of the shredded mass and its capacity to retain air, uniformly distributing the moist shredded mass into a cell in such manner as to naturally aerate the same during its entry and as to form a single relatively deep pile without changing the loose character thereof, fermenting the loose shredded mass aerobically by natural aeration through the air retained within the mass, and, after a period of fermentation, transferring the partially fermented mass, in a manner to aerate and loosen the mass during the transfer, at least once, from one cell to form a single relatively deep pile in one other cell, for further fermentation by natural aeration until the mass becomes converted into a substantially dry humus fertilizer having the appearance of leaf mould.

2. A new process for the treatment of house refuse which comprises first, converting the refuse by mechanical comminution into a loose shredded mass, regulating the moisture in the shredded mass prior to fermentation to provide a quantity of liquid necessary for efficient and complete fermentation without destroying the loose nature of the shredded mass and its capacity to retain air, uniformly distributing the moist shredded mass into a cell in such manner as to naturally aerate the same during its entry and as to form a single relatively deep pile without changing the loose character thereof, fermenting the loose shredded mass aerobically by natural aeration through the air retained within the mass followed by artificial aeration by circulating a current of air throughout the mass, and, after a period of fermentation, transferring the partially fermented mass, in a manner to aerate and loosen the mass during its transfer, at least once, from one cell to form a single relatively deep pile in one other cell, for further fermentation by natural and artificial aeration, until the mass becomes converted into a substantially dry humus fertilizer having the appearance of leaf mould.

3. A new process for the treatment of substantially dry town and house refuse characterized as a mixture containing animal and vegetable substances, ash and inorganic matter and a large proportion of paper, which comprises, first separating therefrom inorganic matter and fine dust and converting the remaining mixture by mechanical comminution into a loose shredded mass the moisture content of which is below that required for efficient fermentation, secondly, moistening the shredded mass at one time and prior to fermentation with a quantity of liquid necessary to bring up the moisture content thereof for efficient and complete fermentation without destroying the loose nature of the shredded mass and its capacity to retain air, thirdly, uniformly distributing the moistened shredded mass into a cell in such manner as to naturally aerate the same during its entry and as to form a single relatively deep pile without changing the loose character thereof, fourth, fermenting the loose shredded mass aerobically by natural aeration through the air retained within the mass and fifth, after a period of fermentation, transferring the partially fermented mass, in a manner to aerate and loosen the mass during its transfer, at least once, from one cell to form a single relatively deep pile in one other cell, for further fermentation by natural aeration until the mass becomes converted into a substantially dry humus fertilizer having the appearance of leaf mould.

4. A new process for the treatment of substantially dry town and house refuse characterized as a mixture containing animal and vegetable substances, ash and inorganic matter and a large proportion of paper, which comprises, first separating therefrom inorganic matter and fine dust and converting the remaining mixture by mechanical comminution into a loose shredded mass the moisture content of which is below that required for efficient fermentation, secondly, moistening the shredded mass at one time and prior to fermentation with a quantity of liquid necessary to bring up the moisture content thereof for efficient and complete fermentation without destroying the loose nature of the shredded mass and its capacity to retain air, thirdly, uniformly distributing the moistened shredded mass into a cell in such manner as to naturally aerate the same during its entry and as to form a single relatively deep pile without changing the loose character thereof, fourth, fermenting the loose shredded mass aerobically by natural aeration through the air retained within the mass followed by artificial aeration by circulating a current of air throughout the mass, and fifth, after a period of fermentation, transferring the partially fermented mass, in a manner to aerate and loosen the mass during its transfer, at least once, from one cell to form a single relatively deep pile in one other cell, for further fermentation by natural and artificial aeration, until the mass becomes converted into a substantially dry humus fertilizer having the appearance of leaf mould.

DOUGLAS McINTYRE PROCTOR.